March 5, 1963  A. C. SINCLAIR  3,080,018
VEHICLE LIFT WITH ADJUSTABLE ARMS
Filed June 1, 1955
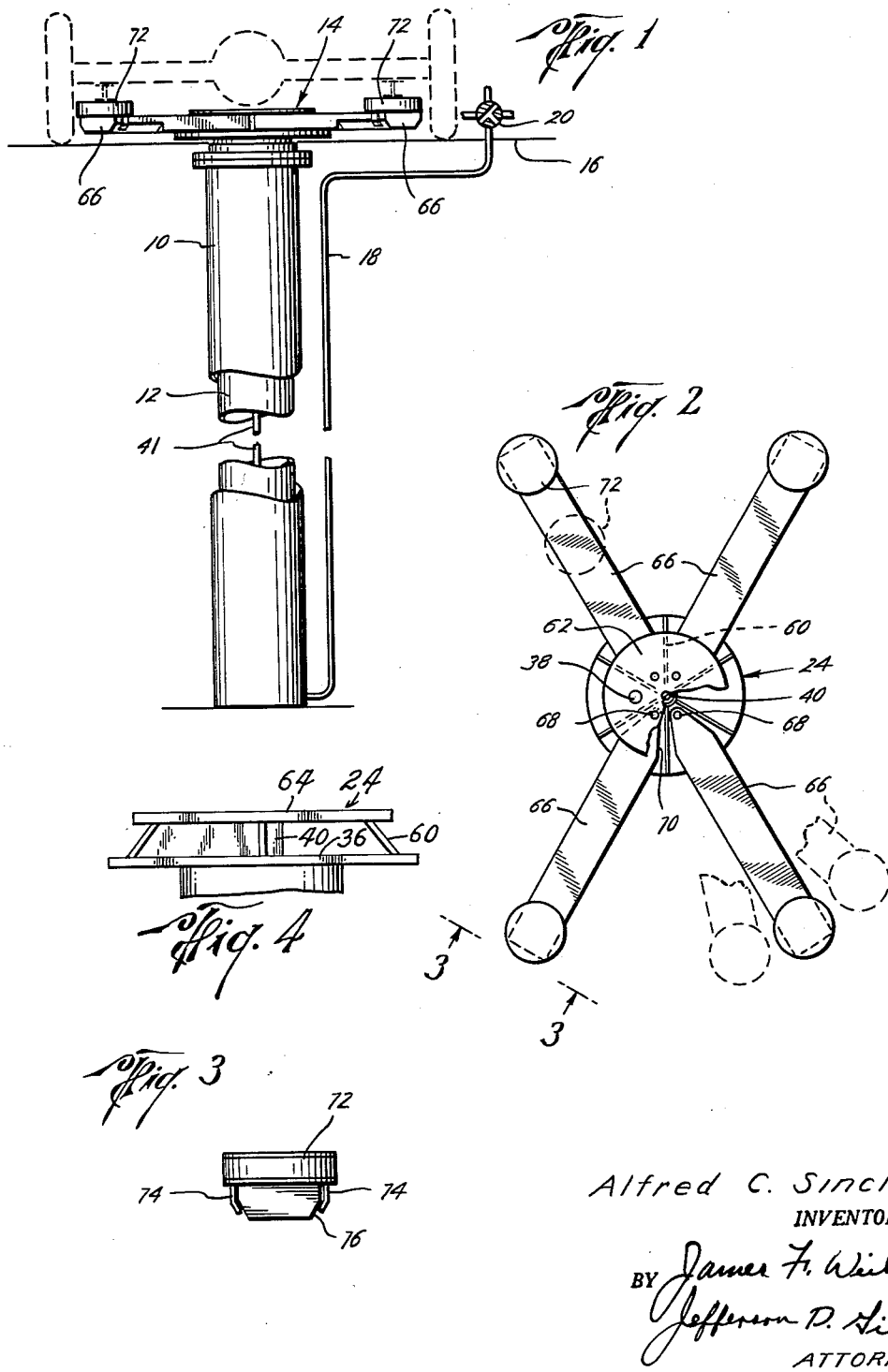
Alfred C. Sinclair
INVENTOR.
BY James F. Weiler
Jefferson D. Giller
ATTORNEYS United States Patent Office 3,080,018
Patented Mar. 5, 1963

3,080,018
VEHICLE LIFT WITH ADJUSTABLE ARMS
Alfred C. Sinclair, Houston, Tex., assignor to Anderson, Clayton & Co., Houston, Tex., a corporation of Delaware
Filed June 1, 1955, Ser. No. 512,422
3 Claims. (Cl. 187—8.75)

The present invention relates to lifts and, more particularly, relates to lifts particularly adapted for the elevation of automobiles for under body servicing.

An object of the present invention is the provision of an automobile lift which includes readily adjustable automobile support means of the type which engages the underside of the automobile rather than the wheels thereof, and includes a minimum of bracing so that under body servicing of the automobile may be accomplished with little or no interference.

Other and further objects, features and advantages will be apparent as a description of a preferred example of the invention proceeds, given for the purpose of disclosure and taken in conjunction with the accompanying drawings, where like character references designate like parts throughout the several views, and where FIGURE 1 is a side elevation, partly in section, illustrating an automobile lift according to the invention, FIGURE 2 is a plan view illustrating the automobile supporting carriage for supporting the automobile on the lift, FIGURE 3 is an end view taken along the line 3—3 of FIGURE 2, and FIGURE 4 is an enlarged, fragmentary view illustrating the head member of the present invention.

Referring now to the drawings, and particularly to FIGURE 1, the lift includes a cylinder or outside casing 10 sealed at the lower end and open at the top end into which is slidably secured a ram or plunger 12, the upper end of which is connected to an automobile supporting structure or carriage generally designated by the reference numeral 14. Usually, as indicated, the cylinder or casing 10 is embedded in the ground with its upper open end slightly below the level of the ground or garage floor 16 and an air line 18 is provided which also is embedded in the ground and extends down into the outer casing 10 at its lower end. The upper end of the air line 18 includes a two-way valve 20 for exhausting and supplying air from a source, not shown, for actuation of the lift.

Turning now to FIGURE 2 the automobile supporting superstructure or carriage 24 includes the head member 36 which is divided by the radial partitions 60 into a series of generally triangularly-shaped and outwardly diverging compartments 62. As best seen in FIGURE 4 there is provided an upper plate 64 and the head 36 serves as a lower plate.

Referring again to FIGURE 2, four arms 66 are pivotally secured by the pins 68 in the inner ends of diametrically-opposed compartments 62, the inner ends of the arms 66 being tapered, as at 70 to permit limited pivoting movement of the arms 66 in a horizontal plane.

Slidably secured on the support arms 66 are the support pads 72 which have the depending arms 74 with the inwardly turned ends engaging the chamfered sides 76 of the support arms 66. Thus, the pads 72 are free to slide along the arms 66 to the appropriate position for engaging an element of the under body of the automobile.

The automobile supporting structure is therefore fully adjustable to engage the underside of an atomobile to be lifted and it is noted that only four arms are necessary without any bracing so that a minimum of interference with under body servicing is obtained.

With the lift in elevated position, servicing of the under body of the automobile or the wheels may be performed with a minimum of interference due to the automobile supporting structure.

A vehicle lift with adjustable arms constructed according to the invention provides a fully adjustable automobile supporting structure which engages the under body of the automobile with a minimum of elements so that ready access is provided to the under body of the automobile for servicing.

While the examples of the invention have been directed particularly for use as an automobile lift, other uses and adaptations will suggest themselves to those skilled in the art which are encompassed within the invention. The present invention, therefore, is well suited to carry out the objects and attain the ends and advantages mentioned as well as others inherent therein.

Numerous changes and rearrangement of parts will suggest themselves to those skilled in the art which are encompassed within the spirit of the invention and the scope of the appended claims.

What is claimed is:

1. In a lift, the improvement comprising an automobile supporting structure including a head having a pair of plates disposed in parallel vertical relationship, transverse partition means partitioning the space between said plates into a plurality of radially-extending compartments, a plurality of arms, and pivot means freely pivoting the inner end of each arm in one of said compartments.

2. In a lift, the improvement comprising an automobile supporting structure including a head having a pair of plates disposed in parallel vertical relationship, transverse partition means partitioning the space between said plates into a plurality of radially-extending compartments, a plurality of arms, pivot means freely pivoting the inner end of each arm in one of said compartments, and means on said arms for engaging the underbody of an automobile.

3. The automobile supporting structure of claim 2 where the means on said arms for engaging the underbody of an automobile are mounted for sliding movement longitudinally of said arms.

References Cited in the file of this patent

UNITED STATES PATENTS

| | | |
|---|---|---|
| 635,848 | Dutton | Oct. 31, 1899 |
| 963,905 | Larsson | July 12, 1910 |
| 1,574,351 | Altgelt | Feb. 23, 1926 |
| 1,938,550 | Todd | Dec. 5, 1933 |
| 2,204,365 | Klemm | June 11, 1940 |
| 2,239,893 | Jackman | Apr. 29, 1941 |
| 2,464,315 | Hurd | Mar. 15, 1949 |
| 2,713,922 | Harrison | July 26, 1955 |
| 2,777,538 | Cochin | Jan. 15, 1957 |
| 2,878,897 | Cochin | Mar. 24, 1959 |

FOREIGN PATENTS

| | | |
|---|---|---|
| 705,438 | France | Mar. 9, 1931 |
| 446,774 | Great Britain | May 6, 1936 |
| 497,847 | Belgium | Sept. 15, 1950 |